US006725025B1

United States Patent
Schmidl et al.

(10) Patent No.: US 6,725,025 B1
(45) Date of Patent: Apr. 20, 2004

(54) INTERFERENCE CANCELLATION AMONG WIRELESS UNITS USING GIBBS SAMPLING

(75) Inventors: Timothy M. Schmidl, Dallas, TX (US); Alan Gatherer, Richardson, TX (US); Xiaodong Wang, College Station, TX (US); Rong Chen, Chicago, IL (US)

(73) Assignee: Texas Instruments Incorporated, Dallas, TX (US)

( * ) Notice: Subject to any disclaimer, the term of this patent is extended or adjusted under 35 U.S.C. 154(b) by 413 days.

(21) Appl. No.: 09/665,843

(22) Filed: Sep. 20, 2000

Related U.S. Application Data

(60) Provisional application No. 60/159,705, filed on Oct. 15, 1999.

(51) Int. Cl.[7] ............................................... H04B 1/06
(52) U.S. Cl. ...................... 455/278.1; 455/295; 455/296
(58) Field of Search ........................... 455/63, 67.3, 296, 455/501, 575.65, 67.1, 550, 278.1, 283, 295; 370/342, 208, 346, 206, 441, 335, 209, 479, 320; 375/148, 206–210, 346–350, 316, 144, 341, 262, 200; 329/318, 348, 349; 704/500, 504, 226, 230; 714/780, 746, 786, 795

(56) References Cited

U.S. PATENT DOCUMENTS

| | | | | |
|---|---|---|---|---|
| 5,533,012 A | * | 7/1996 | Fukasawa et al. | ............. 370/18 |
| 5,872,776 A | * | 2/1999 | Yang | ......................... 370/342 |
| 6,161,209 A | * | 12/2000 | Moher | ........................ 714/780 |

OTHER PUBLICATIONS

Electronics Letters, Jun. 22, 1995, vol. 31, No. 13, Rajan et al., "parameter estimation of time–varying autoregressive mod using Gibbs Sampler".*

IEEE 0163–6804/96, 1996, Moshavi, "multi–user detection for DS–CDMA communications".*

IEEE 0900–6778/98, 1998, Divsalar et al., "Improved parallel interference cancellation for CDMA".*

IEEE 0–0783–6560–7/00, 2000, Wang et al. "Turbo multiuser detection for nonlinearly modulated CDMA in Unknown channels".*

Divsalar, et al., "Improved Parallel Interference Cancellation for CDMA", *IEEE Trans. Communications*, vol. 46, No. 2 (Feb. 1998), pp. 258–268.

Moshavi, "Mulit–User Detection for DS–CDMA Communications", *IEEE Communications Magazine* (Oct. 1996), pp. 124–136.

Rajan, et al., "Parameter estimation of time–varying autoregressive models using the Gibbs sampler", *Electronics Letters*, vol. 31, No. 13 (Jun. 22, 1995), p. 1035–1036.

* cited by examiner

*Primary Examiner*—Quochien B. Vuong
*Assistant Examiner*—C. Chow
(74) *Attorney, Agent, or Firm*—Ronald O. Neerings; Wade James Brady, III; Frederick J. Telecky, Jr.

(57) ABSTRACT

An improved interference cancellation technique is disclosed. Digital baseband circuitry (40) includes user and symbol detection circuitry (50) for performing a Gibbs sampler type of interference cancellation, either embodied in custom hardware (44) or in software. Random initial guesses for a signal sample (either a symbol or chip) are made for each user. Interference cancellation is performed on a user-by-user basis, using the then-current data decision values for the other, interfering users. A soft data decision is used to derive a probability distribution function for the actual data decision for the sample for the user. A randomly selected value is applied against the probability distribution function to generate the next data decision value for that user, and the process is repeated until convergence. Following convergence, a statistic is used to select a final data decision value for each user, from the set of intermediate data decision values stored in memory.

15 Claims, 5 Drawing Sheets

INTERFERENCE CANCELLATION AMONG WIRELESS UNITS USING GIBBS SAMPLING

CROSS-REFERENCE TO RELATED APPLICATIONS

This application claims priority, under 35 U.S.C. §119 (e), of Provisional Application No. 60/159,705, filed Oct. 15, 1999.

STATEMENT REGARDING FEDERALLY SPONSORED RESEARCH OR DEVELOPMENT

Not applicable.

BACKGROUND OF THE INVENTION

This invention is in the field of wireless communications, and is more specifically directed to methods of cancelling interference among wireless units communicating with the same base station.

The use of wireless communications, for both voice and now also data, has exploded over recent years. Even with the high density of base stations now present in many cities, and with the high capacity provided by code-division multiple access (CDMA) technology, the number of users that may be supported by each base station has become a limiting factor in the system capacity. Indeed, it has been observed that interference from other users within a cell is now the most significant factor limiting cell capacity, even more significant than additive thermal noise.

Interference cancellation (IC) techniques have been developed to improve base station uplink capacity, and thus the number of users that may be served by a base station. In general, IC performed at the base station attempts to remove, from each received user signal, interference from other users before making each data decision (i.e., deciding the value of each symbol or "chip"). Conventional IC techniques can be categorized as either serial or parallel. Serial, or successive, IC processes each user signal in a sequence, cancelling the interference caused by each remaining user in the sequence. Parallel IC simultaneously removes, for each user, the interference from all other users. As may be expected, the delay required for parallel IC is much less than that for serial IC. As such, parallel IC has become quite popular. Additional detail in this regard is provided in Divsalar, et al., "Improved Parallel Interference Cancellation for CDMA", *IEEE Trans. Communications,* Vol. 46, No. 2 (February 1998), pp. 258–268, and in Moshavi, "Multi-User Detection for DS-CDMA Communications", *IEEE Communications Magazine* (October. 1996), pp. 124–136. As described in the Divsalar et al. and Moshavi articles, variations of parallel interference cancellation have been proposed.

FIG. 1 illustrates one stage of a conventional parallel interference cancellation (PIC) detector, by way of background. This conventional approach is based on "hard" data decisions. Initial bit estimates $d_k(0)$ are conventionally derived from a matched filter detector or the like. These initial bit estimates are scaled by amplitude estimator 2, by the application of an amplitude estimate A for each user (delayed by a delay time $T_b$, as are all signals in FIG. 1). The scaled initial bit estimates are then respread into chip form by spreader 3, resulting in an estimate of the received signal for each user. These estimates are applied to partial summer 4 which sums, for each user, all of the estimates for all other users (and excluding the user of concern). In other words, for a user i, partial summer 4 produces the partial sum $$\sum_{x \neq i} s_x,$$

where $s_x$ is the estimate from spreader 3 for a given user x. These partial sums constitute an estimate of the regenerated interference from other users.

The outputs of partial summer 4 are applied to the negative input of a summer 7 associated with each user; the positive input of the ith summer 7 receives the most recently received signal $r_i$ for its corresponding user i. The output of summer 7 thus provides the an estimate of the received signal $r_i$ less the regenerated interference from all other users. These estimates after cancellation of the regenerated interference are applied to a matched filter bank 8, and are then applied to a data decision function 9 for each user, producing the next iterated values of data decisions $d_i(1)$ for each user (from i=1 to i=k).

These next values of data decisions are then applied to a next stage of the parallel interference cancellation detector, to produce the next succeeding iterated value. The process is then repeated until convergence.

This conventional IC methodology, and its conventional variations, rely on the convergence of the data decisions; however, in practice, no such convergence is guaranteed. In particular, it has been observed, in connection with the present invention, that convergence will occur only if the initial guesses are accurate for a significant fraction of the users being considered. Also, in conventional PIC approaches, convergence tends to reliably occur only if the interference among users is relatively low.

The need for a more robust interference cancellation approach thus exists in the art, particularly as the density of wireless units in the-field continues to increase.

By way of further background, a known sampling technique is referred to in the art as Gibbs sampling. The Gibbs sampler is a Markov-chain Monte Carlo technique in which random variables are drawn from a joint probability density function. Each random variable is supplied with an initial guess, which- need not be particularly accurate. The value of one random variable is then selected from the joint probability density function, using the initial guesses for the other variables. The value of the next variable is then in turn selected from the joint probability density function, given the then-current values of all other variables. Following a transient period that typically involves several passes through the sequence of variables, continued operation of the Gibbs sampler will derive a relatively accurate distribution of values for each variable, from which estimations may be made. Further discussion of the Gibbs sampler may be found in Rajan, et al., "Parameter estimation of time-varying autoregressive models using the Gibbs sampler", *Electronics Letters,* Vol. 31, No. 13 (Jun. 22, 1995), pp. 1035–1036.

BRIEF SUMMARY OF THE INVENTION

It is therefore an object of the present invention to provide an interference cancellation method and system that is useful for accurately cancelling interference in crowded wireless communications cells.

It is a further object of the present invention to provide such a method and system that may be used in applications in which inter-user interference is significant.

It is a further object of the present invention to provide such a method and system in which convergence does not strongly depend upon the accuracy of the selection of initial conditions.

Other objects and advantages of the present invention will be apparent to those of ordinary skill in the art having reference to the following specification together with its drawings.

The present invention may be implemented into a communications station or device for wireless voice and data communications. In the station, memory is provided for storing samples of multiple interfering signals, in the form of chips or symbols. Random initial guesses are made for the data decisions of each signal. For a selected signal, interference cancellation is then performed by subtracting regenerated interference or by cross-correlation, using the current data decisions (either initial guesses or derived values) for the interfering signals. This provides a "soft" data decision value for the selected signal, which defines a probability distribution from which a random selection process determines a new data decision value. These operations are then repeated, signal by signal, until convergence. Following convergence, the distribution of data decision values for each user generates an estimate of the actual communicated signal. The random selection of a new data decision value from the "soft" data decision, and also the random initial guesses, ensure convergence over a wide range of interference conditions, independently from the values off the initial data decision guesses.

DETAILED DESCRIPTION OF THE INVENTION

The preferred embodiment of the invention will now be described in detail, and in connection with the example of a code-division multiple access (CDMA) wireless communications system, such as are now used in the art. The present invention is particularly advantageous when used in connection with such systems. However, it is also contemplated that the present invention may also provide benefits in the cancellation of multiple user or channel interference in connection with other systems and applications. It is therefore to be understood that that the following description is provided by way of example only, without limitation upon the full scope of the invention as claimed.

Figure 2:
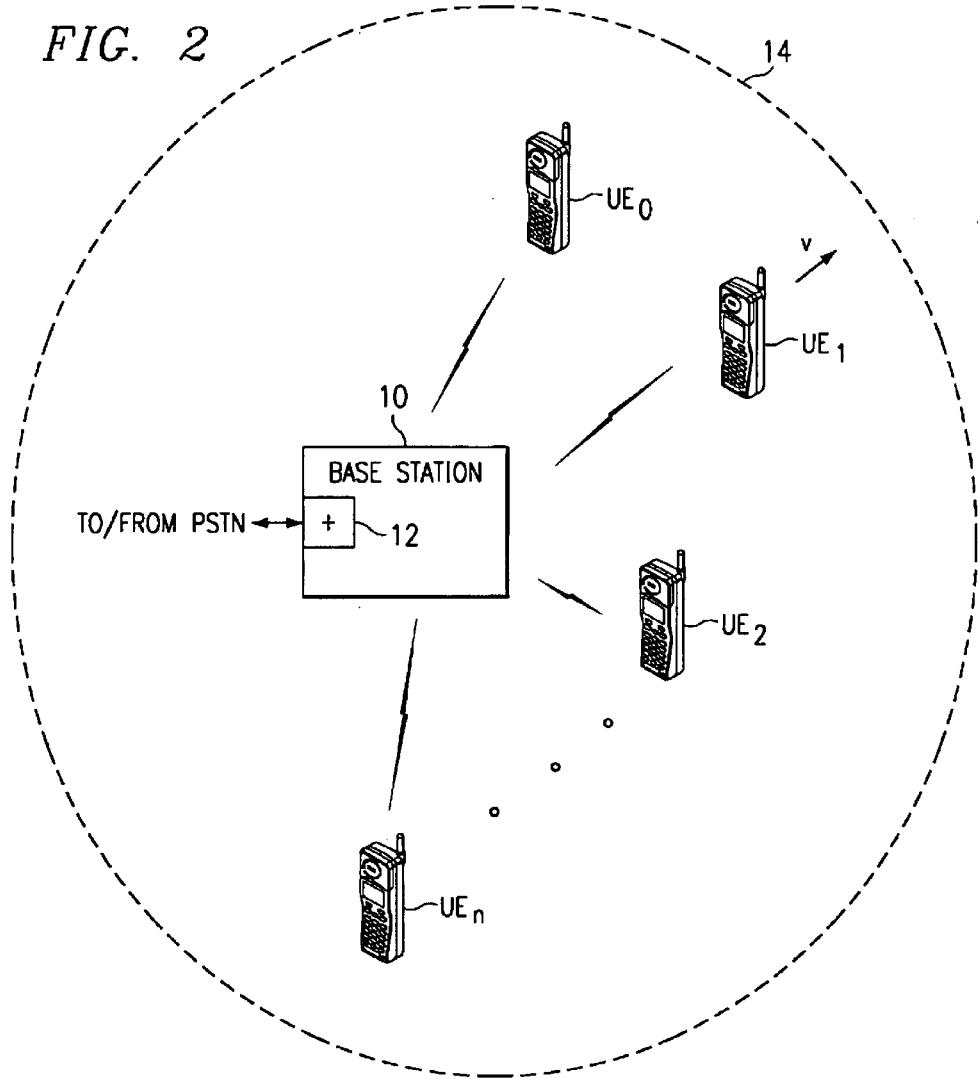
FIG. 2 is a schematic diagram illustrating a wireless communications system.

An example of a deployment of a wireless communications system, according to the preferred embodiment of the invention, is illustrated in FIG. 2. As shown in FIG. 2, base station 10 is located somewhat centrally within an area of coverage, or cell, 14. Base station 10, as is conventional in the art, is a fixed facility which transmits and receives broadband, or spread spectrum, wireless communications to and from wireless units UE that are physically located within cell 14. As shown in FIG. 2, and is typical in the art, wireless units UE are mobile wireless units, such as digital cellular telephones. The number of wireless units UE within cell 14 may vary widely, depending upon the population density, time of day, day of the week, and other factors.

The communications carried out between base station 10 and wireless units UE are, in this example, telephonic conversations between one of wireless units UE and another telephone set elsewhere in the telephone network. Base station 10 therefore includes the appropriate circuitry for effecting broadband communications with wireless units UE, as will be described in further detail below. Additionally, base station 10 includes switching system 12 that carries out some level of switching of the communications links between individual wireless units UE and the public switched telephone network (PSTN), or in the case of data communication, to the appropriate computer network.

Of course, the simultaneous conversations being carried out by the multiple wireless units UE in cell 14 must not significantly interfere with one another, to maintain intelligible conversations. This interference is typically the most significant factor that limits the number of units UE that may be served by a single base station 10, and is often the most significant factor in overall system capacity. As noted above, interference cancellation (IC) techniques are performed at base station 10 to compensate for inter-user interference, so that as many users as possible may be supported by each base station.

Figure 3:
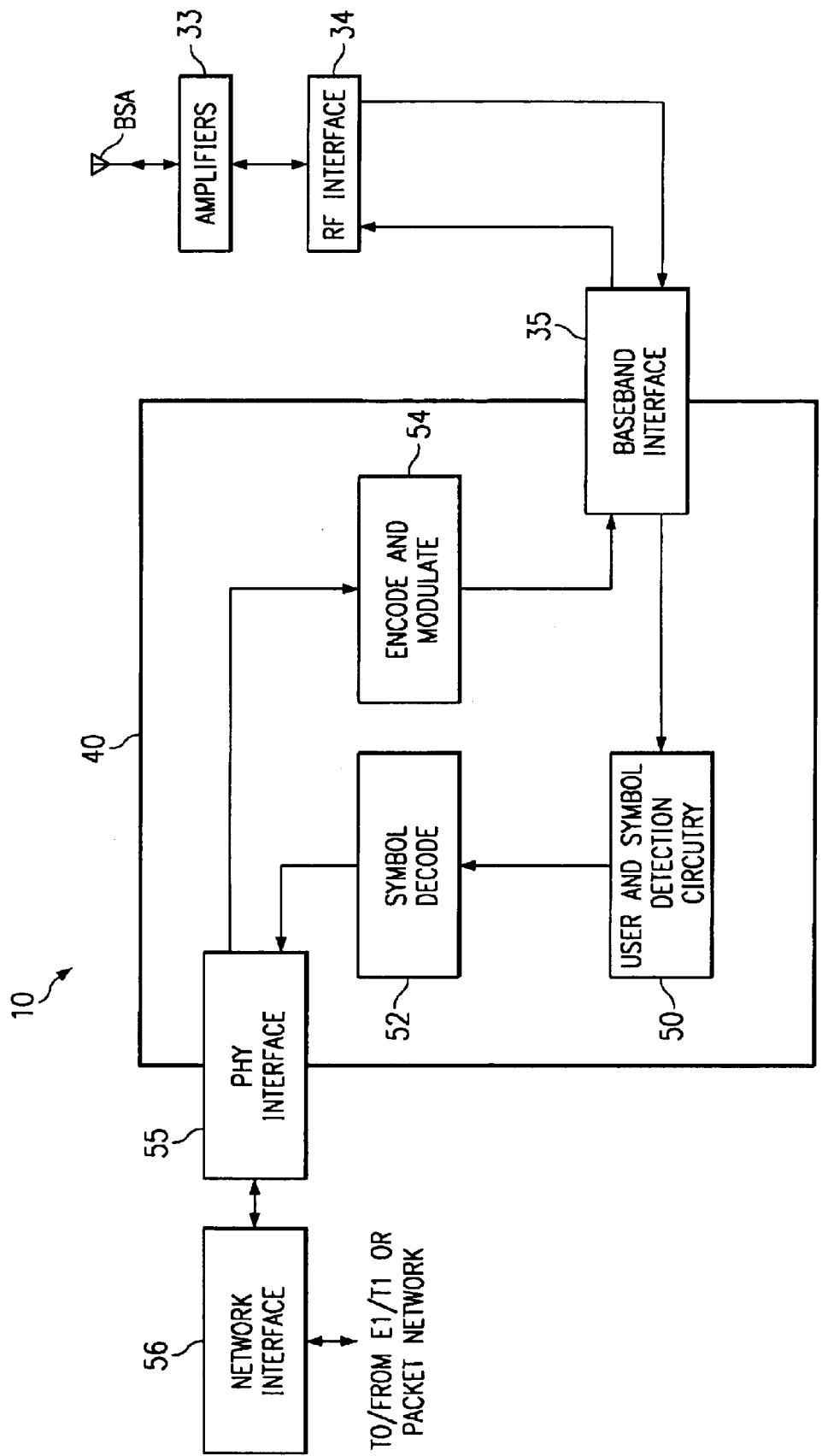
FIG. 3 is an electrical diagram, in schematic form, of a base station in the system of FIG. 2, constructed according to the preferred embodiment of the invention.

Referring now to FIG. 3, the construction of an example of base station 10 according to a preferred embodiment of the invention will now be described, for the case of a second/third generation base transceiver station. It will be appreciated by those skilled in the art that this particular architecture is provided by way of example only, and that other base station architectures may be used according to the present invention.

As shown in FIG. 3, base station 10 includes amplifiers 33 for driving amplified transmission signals over one or more base station antennae BSA, and for amplifying signals received from those antennae BSA. RF interface function 34 includes the appropriate transmit and receive formatting and filtering circuitry. Additionally, RF interface function 34 includes analog-to-digital converters for digitizing the amplified receive signals, and digital-to-analog converters for placing the transmitted signals into the analog domain. As such, RF interface function 34 communicates digitally with baseband interface 35, which provides the appropriate signal formatting between RF interface function 34 and baseband device 40.

Figure 1:
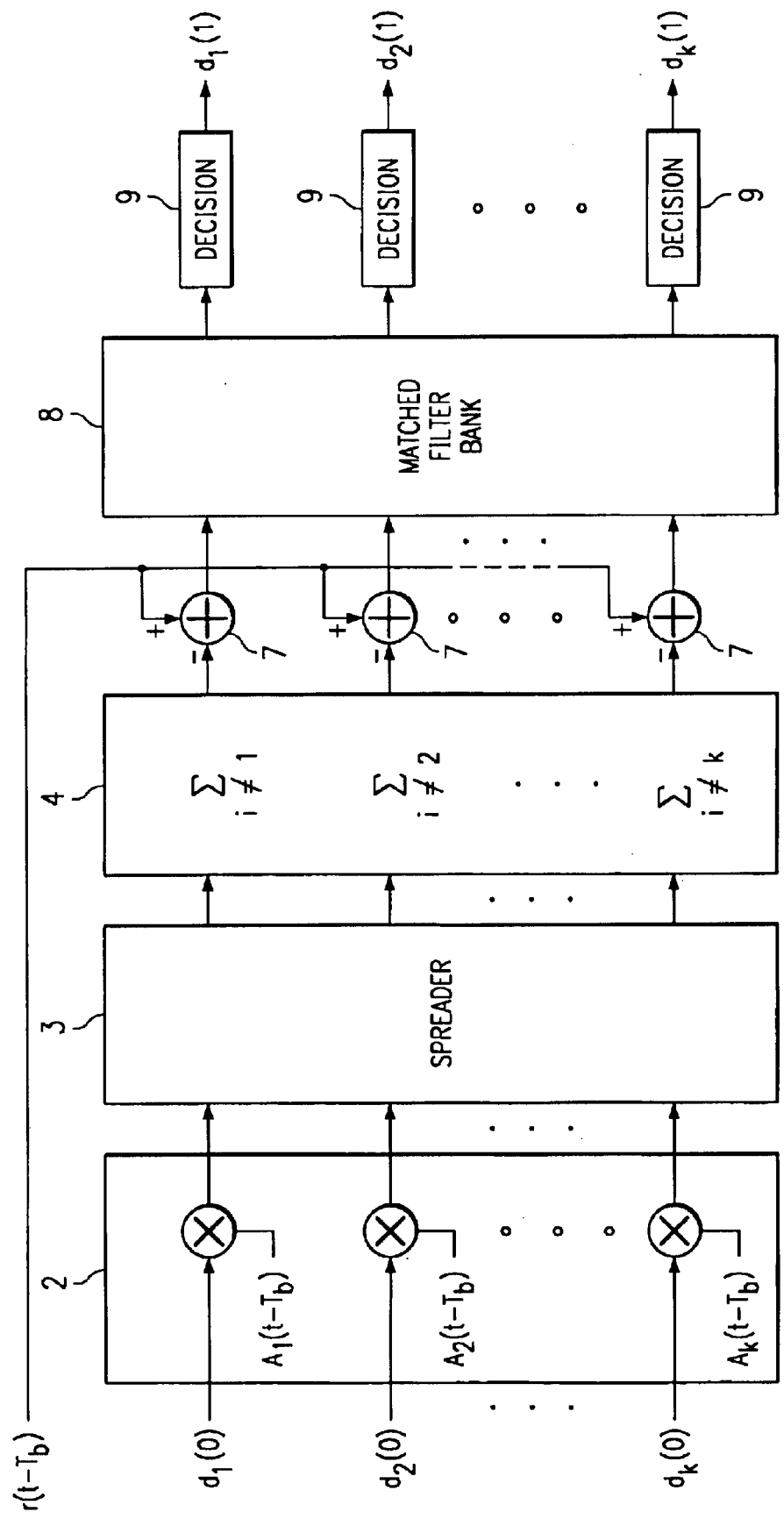
FIG. 1 is a functional data flow diagram illustrating a conventional parallel interference cancellation method.

Baseband device 40 communicates with the ultimate network, which may be of the E1 or T1 class, or a packet network as shown in FIG. 3, by way of physical layer interface 55 and network interface adapter 56. Physical layer interface 55 and network interface adapter 56 are conventional subsystems, selected according to the type of network and corresponding interface desired for base station 10. In the implementation of FIG. 1, network interface adapter 56 interfaces with switching system 12.

Baseband device 40 performs the digital signal processing functions in handling the wireless communications at base station 10. To perform this function, it is contemplated that baseband device 40 will be a subsystem including one or more high-performance digital signal processor (DSP) devices, such as those of the TMS320c5x and TMS320c6x class of DSPs available from Texas Instruments Incorporated, along with the appropriate memory and external functions suitable for handling the digital processing requirements of base station 10. In FIG. 3, the implementation of baseband device 40 will be described according to its various functions, rather than by way of its construction, it being contemplated that those skilled in the art will be readily able to realize baseband device 40 using such conventional integrated circuits from this functional description, and according to the capacity desired for base station 10.

On the transmit side, baseband device 40 includes encode and modulate function 54, which is coupled between physical layer interface 55 and baseband interface 45, as shown in FIG. 3. Encode and modulate function 54 receives digital data from physical layer interface 55, and performs the appropriate digital processing functions for the particular protocol. For example, encode and modulate function 54 may first encode the received digital data into symbols. These symbols are then spread, by way of a spreading code, into a sequence of chips, according to a selected chip rate; the spreading may also include the spreading of the symbols into multiple subchannels. Typically, a cell-specific scrambling code is then applied to the spread symbols, so that the receiving wireless unit UE can distinguish transmissions generated by this base station 10, from those of neighboring cells. Modulation of the spread symbols is then performed; commonly, the multiple subchannels are split into in-phase (I) and quadrature (Q) groups, so that the eventual modulated signal includes both components. The spread spectrum signal is then applied to baseband interface 35, after the appropriate filtering and pre-equalization for channel distortion, for transmission over antennae BSA via RF interface function 34 and amplifiers 33.

On the receive side, baseband device 40 receives incoming digital signals from baseband interface 35, after digitization of the received signals within RF interface function 34. These signals are applied to user and symbol detection circuitry 50, the construction of which will be described in further detail below, and which derives the transmitted symbols from the digitized received data. Considering that base station 10 receives signals over multiple channels, from multiple wireless units UE in its cell 14, user and symbol detection circuitry includes such functions as chip-rate demodulation and despreading, and channel estimation of random channel variation. The demodulated data are then associated with their respective channels, following which symbol decode function 52 decodes the received symbols, for each channel and thus each conversation, into a bit stream suitable for communication to the network via physical layer interface 55 and network interface function 56.

Figure 4:
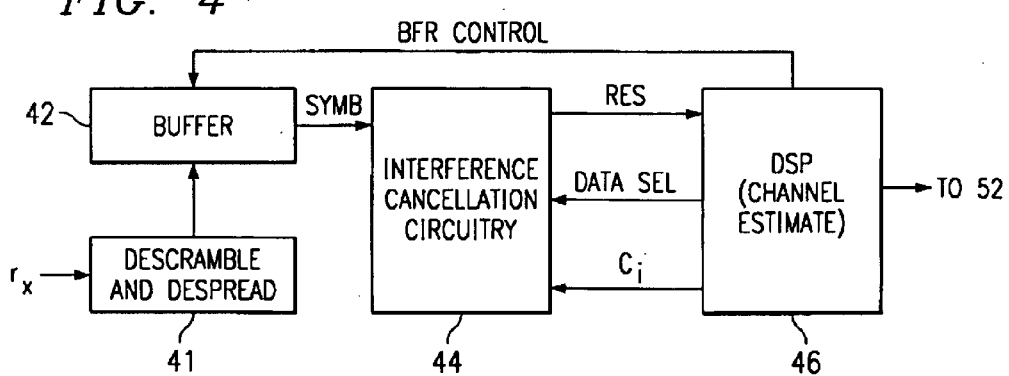
FIG. 4 is an electrical diagram, in schematic form, of an interference cancellation accelerator system in the base station of FIG. 3, according to the preferred embodiment of the invention.

Referring now to FIG. 4, an exemplary construction of user and symbol detection circuitry 50 of FIG. 3 will now be described. In this preferred embodiment of the invention, circuitry 50 includes descrambling and despreading function 41, which performs conventional operations for applying the base station descrambling code to received chips $r_x$ for each of the users, and for also despreading these chips into symbols. The symbols are stored in buffer 42, in association with an identification of their corresponding user, so that circuitry 50 can retrieve the symbols on a user-by-user basis. In this regard, buffer 42 receives control signals from digital signal processor 46, by way of which the desired symbols are forwarded by buffer 42 to interference cancellation circuitry 44 over bus SYMB. Digital signal processor (DSP) 46 according to this preferred embodiment of the invention is a programmable DSP device, which is well-suited for performing channel estimation and other signal processing functions in base station 10. Conventional DSPs that are preferred for use in base station are those of the TMS320c6x family of DSPs, available from Texas Instruments Incorporated.

Interference cancellation circuitry 44, according to this embodiment of the invention, receives symbols from buffer 42, as selected by DSP 46. In addition, DSP 46 provides channel estimates $c_1$ and data selection control signals to interference cancellation circuitry 44, in response to which interference cancellation circuitry 44 provides data decision results to DSP 46 on bus RES. These data decisions are then processed by DSP 46 in the conventional fashion, and forwarded on to the remainder of base station 10 for further processing and forwarding to the uplink.

According to the implementation of this embodiment of the invention, as shown in FIG. 4, interference cancellation circuitry 44 is custom hardware for performing the interference cancellation operations to be described below relative to FIG. 5. It is contemplated that those skilled in the art having reference to this description will be readily able to implement such custom circuitry, given this operational description. Alternatively, the interference cancellation operations described below may alternatively be implemented, in whole or in part, in software, executed by a general-purpose microprocessor, by a DSP device, or by other programmable logic. Again, it is contemplated that those skilled in the art having reference to this specification will be readily able to realize, in a base station such as base station 10, the interference cancellation functionality of the preferred embodiment of the invention.

Figure 5:
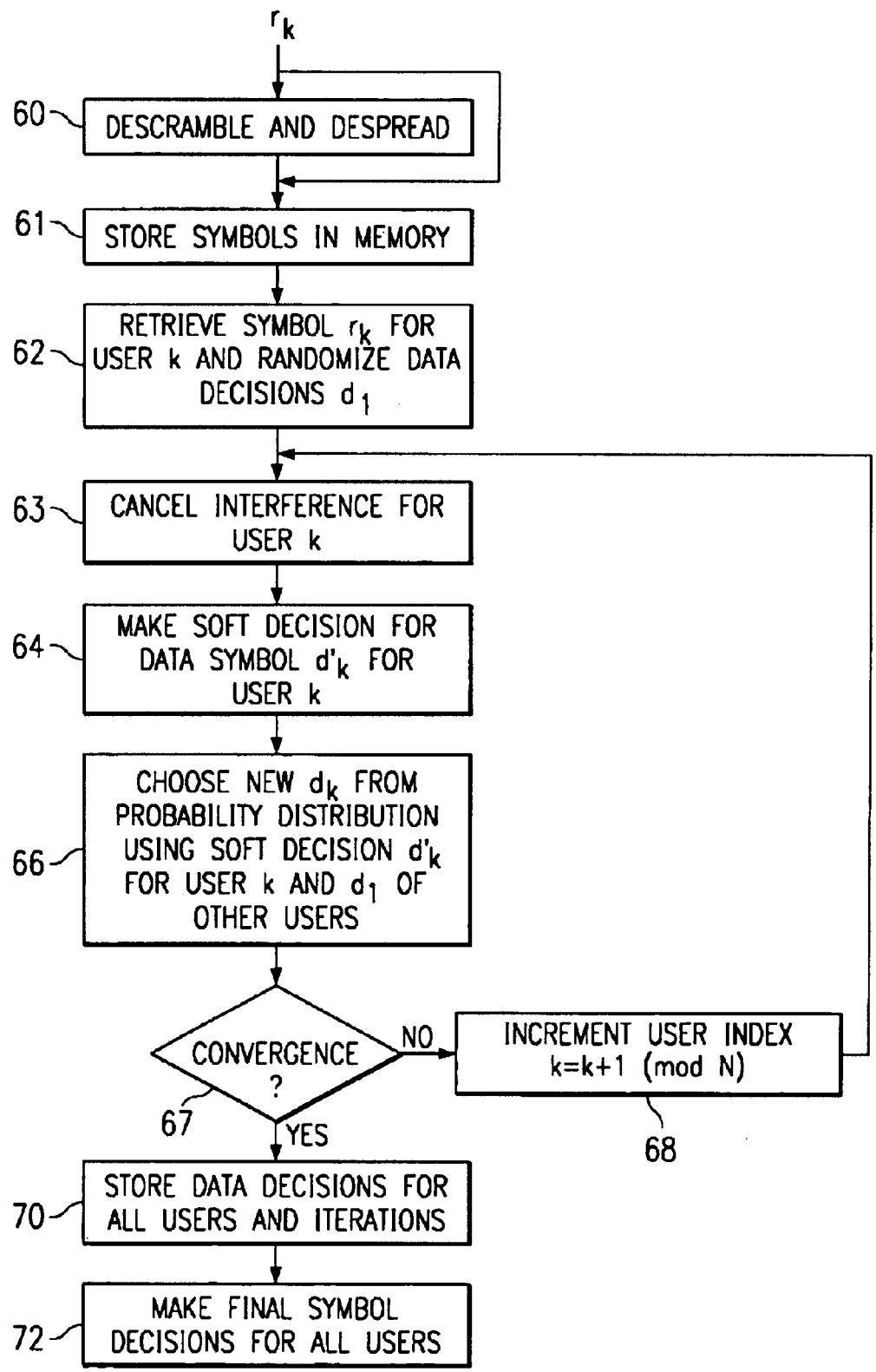
FIG. 5 is a functional data flow diagram illustrating a parallel interference cancellation method according to the preferred embodiment of the invention.

Referring now to FIG. 5, a functional flow of the interference cancellation operations according to the preferred embodiment of the invention, as will be performed by circuitry 44 of FIG. 4, or alternatively in software as noted above, will now be described in detail. According to the preferred embodiment of the invention, interference cancellation may be performed on incoming signals $r_k$ either as chips, in the spread spectrum sense, or as symbols. If interference cancellation is to be carried out in symbol form, process 60 is performed to descramble and despread the incoming chips into symbols, which are then stored in memory in process 61. If interference cancellation is to be carried out on the incoming signals in chip form, the chips themselves are directly stored in memory in process 61. In either case, the symbols or chips stored in process 61 are from all currently operating users in the cell.

For clarity of description, the remainder of the interference cancellation method according to this preferred embodiment of the invention will be described as performed upon symbols, rather than chips, where the cancellation is performed on a symbol-by-symbol basis for all users (numbering N) simultaneously.

As will be apparent from the following description, the interference cancellation is performed user-by-user, with multiple passes through all N users executed to convergence. This user-by-user operation effectively follows a Gibbs sampler type of process, in which a joint probability distribution is evaluated from a random sample for one user, using the current values of the other variables in the distribution. Prior to the first pass, process 62 is performed to retrieve the symbol $r_k$ for selected user k to be first processed. In addition, process 62 randomly chooses values for each of the data decisions $d_l$ for all users other than user k. These data decisions $d_l$ are selected from the available values for the particular modulation being used (e.g., ±1 for BPSK, or ±1±j for QPSK).

In process 63, interference cancellation is performed for a selected user k. This interference cancellation is performed in substantially the conventional manner, in that the effects of the simultaneously received symbols for all users other than user k are subtracted from the received signal for user k. At the symbol level, interference cancellation process 62 is simultaneously performed for all users by calculation and storage of a crosscorrelation matrix between symbols from the various users. Regeneration of interference is performed by retrieving the current values of data decisions $d_l$ for each user l (excluding user k) multiplying these values by the crosscorrelation matrix, and subtracting the result from the original despread symbols stored in memory, in process 61.

Alternatively, interference cancellation process 62 may be performed at the chip level by determining, for a selected user k, the difference:

$$r_k - \sum_{l \ne k} d_l(sc_l)(sp_l)(ce_l)$$

where $r_k$ is the received symbol for user k. The sum corresponds to the sum, over each interfering user l, of the current value of its data decision $d_l$ multiplied by its scrambling code $sc_l$, spreading code $sp_l$, and an estimate $ce_l$ of the channel effects. Following interference cancellation at the chip level, descrambling, despreading, and maximal-ratio combining (MRC) operations are then performed, using channel estimates for the users.

Of course, no current values for data decision $d_l$ are available during the first pass through the process of FIG. 5. As noted above, however, the initial values for data decisions $d_l$ are instead randomly selected in process 62. This random initialization assures convergence of the Gibbs sampler method according to this preferred embodiment of the invention.

The result of interference cancellation process 62 is applied to process 64, in which a "soft" data decision $d'_k$ is made for user k based upon the difference from process 62. Data decision $d'_k$ is "soft", in that the result is not forced to one of the available signal values. For example, in BPSK modulation, the available signal values are +1, −1, and in QPSK modulation, the available signal values are ±1±j. In contrast, the data decision $d'_k$ is "soft" in that it provides a value from along a continuum, rather than a discrete value selected from the available signal levels.

In process 66, the soft data decision $d'_k$ is used to derive a new value for the data decision $d_k$ for the current user k. The combination of soft data decision $d'_k$ and an estimate of the ratio $E_b/N_o$ ($E_b$ corresponding to the bit energy for user k, and $N_o$ corresponding to the random, or thermal, noise) can provide a conditional probability density function (pdf) for the true symbol value $X_k$. According to the preferred embodiment of the invention, process 66 randomly selects a sample from this probability density function, and makes a data decision $d_k$ based upon this selection.

Process 66 may be described by way of an example, for BPSK modulation in which the possible true symbol values $X_k$ are ±1 (for perfect channel estimation, and removal of amplitude and phase interference). For noise variation $\sigma^2$, one may express a ratio of the conditional probabilities of $x_k=+1$ to $x_k=-1$ as:

$$\frac{p[x_k = +1 \mid \sigma^2, X_l, Y]}{p[x_k = -1 \mid \sigma^2, X_l, Y]} = \exp\left\{\frac{2d'_k}{\sigma^2}\right\}$$

where $X_l$ is the set of all elements of the current data decisions $d_l$ for users l other than selected user k (i.e., for the interfering users); Y refers to the observed data, as in Gibbs sampler nomenclature. Because these two conditional probabilities add to unity (these are the only two possible true values), one may express the conditional probability that $x_k=-1$ for a given soft data decision $d'_k$ as:

$$p[x_k = -1 \mid \sigma^2, X_l, Y] = \frac{1}{1 + \exp\left\{\frac{2d'_k}{\sigma^2}\right\}}$$

In this example, process 66 is performed by drawing a random value of a variable q that is uniformly distributed over a range from 0 to 1. The random value of variable q is then compared to the value of the exponential term $$\frac{1}{1 + \exp\left\{\frac{2d'_k}{\sigma^2}\right\}},$$

using the current soft decision value $d'_k$. In the BPSK example, if the randomly selected value of q is less than the exponential term, the data decision $d_k$ is set to −1; if q is greater, data decision $d_k$ is set to +1.

For example, if soft data decision value $d'_k$ is 0.5, and for a noise variation $C\sigma^2$ of 0.5, the value $$\frac{1}{1 + \exp\left\{\frac{2d'_k}{\sigma^2}\right\}}$$

is approximately 0.12, providing a 12% probability that the randomly selected value of q will render a −1 data decision and an 88% probability that it will render a +1 decision.

It is contemplated that the corresponding probability density functions for other modulation schemes, such as QPSK, can be readily derived by those skilled in the art having reference to this specification.

Following the determination of data decision $d_k$ for user k in process 66, circuitry 50 evaluates the current results, corresponding to the set of data decisions d, against a convergence criterion. For example, a predefined number of passes may be counted, with convergence assumed beyond a certain count. Alternatively, the frequency with which the data decisions $d_k$ are changing can be monitored, and convergence determined when this frequency is reached. Further in the alternative, a combination of these criteria may be used (frequency of change below a certain limit, after a defined number of passes are completed). If convergence has not yet been reached (decision 67 is NO), such as in the first pass through each of the N users, control passes to process 68 in which the user index k is incremented (i.e., k=k+1). The incrementing of process 68 is performed in a modulo-N fashion, such that the incrementing wraps around the set of N users repetitively. Interference cancellation process 63 is then performed for the next user, and another pass commences.

The Gibbs sampler operation of the method of FIG. 5 results from the repetition of the cancellation and data decision determination, with the user index incremented in process 68, and wrapping around the N users. Each pass through the process uses an updated value for the most recently processed user. For example, after the first pass, the set of data decisions $\{d_0, d_1, d_2, \ldots d_{N-1}\}$ appears as follows (assuming that the first user k=0):

$$\{d_0^1, d_1^0, d_2^0, \ldots d_{N-1}^0\}$$

where the superscript refers to the pass generating the current data decision value for the user (indicated by the subscript). During the first pass through the process, as noted above, the initial data decision values $\{d_1^0, d_2^0, \ldots d_{N-1}^0\}$ are each the randomly selected values from process 62. After the first pass, value $d_0^1$ is derived in process 66, for the first user (k=0). This value $d_0^1$ is then used, along with random values $d_1^0, d_2^0, \ldots d_{N-1}^0$, to derive the data decision value $d_1^1$ for user k=1. The iterative passes through each of the N users then continues until convergence.

Upon determining that convergence has been reached (decision 67 is YES), the set of data decision values d for all N users, and for each of the passes, are stored in memory, in process 70. According to the preferred embodiment of the invention, not only the most recent data decision values are stored, but instead the values from each of the passes are instead stored in memory. The storage of all values from all iterations permits statistical determination of the symbol decisions, and thus improved accuracy, relative to that provided simply by using the most recent value. This is especially true considering that the convergence determination is preferably made over all users, in which case each individual user may not be itself converged. In process 72, accordingly, circuitry 50 effects the final symbol decisions for each of the N users of base station 10 using a statistical decision. For example, the final symbol data decision may be made simply from a simple statistic, such as the mean or mode, of the stored values for each user. Preferably, the statistic is determined after discarding the data decision values from early iterations, such as those prior to a selected number or those prior to convergence. Alternatively, a more complex statistical analysis may instead be undertaken in process 72, for example by weighting more recent values more heavily.

Following the completion of process 72, the symbol decisions for each of the users are forwarded downstream in base station 10. Referring to the example of FIG. 3, circuitry 50 forwards the final symbol decisions to symbol decode 52, for decoding and further processing in the conventional manner.

As noted above, the preceding described the processing by circuitry 50 on an individual symbol basis. Alternatively, the present invention may be applied to a block of symbols. According to this block approach, if any of the symbols in a block have already been processed (i.e., as also residing within a previously-processed block), their data decisions from process 72 may be used in the next block as well. Any symbols that are partially present within the processed block (e.g., due to time lag from distant wireless users) may be treated as noise. In this block process, the symbols that are to be processed for each user are considered as a vector, and the process of FIG. 5 is applied in a vector-by-vector fashion for each user.

The present invention has been observed, through simulation, to provide outstanding performance in the cancellation of interference at a base station in a wireless network. In one example, fifty users transmitted to a base station through an AWGN channel according to CDMA protocol at identical power levels and synchronous operation, with random phase rotations from 0 to $2\pi$. A 64-chip spreading code was also randomly selected, with each chip selected from the available values $\pm 1 \pm j$.

For the case of a raw BER of 0.10, the process according to the preferred embodiment of the present invention provided a 0.6 dB gain in the $E_b/N_0$ ratio, relative to a conventional three-stage parallel interference canceller. This improvement translates to a 15% increase in the available capacity of the base station uplink, which would translate to a similar system capacity increase. For a low BER of 0.01, such as useful for low Doppler rates found in indoor environments, the preferred embodiment of the invention provides a 2.8 dB gain in the $E_b/N_0$ ratio over the conventional three-stage PIC, providing a 90% capacity gain. These dramatic improvements in base station capacity are directly enabled by the Gibbs sampler approach of the present invention, as described above.

As is well known in the art, modern wideband CDMA ("WCDMA") communications may be carried out according alternative methods of data transfer, one being time division duplex ("TDD") and another being frequency division duplex ("FDD"). The first embodiment of the present invention was presented by way of its implementation into a base station, contemplated to be operating according to either FDD or TDD data transfer. In the case of TDD communications, however, due to the relatively small spreading factors, it is contemplated that the present invention may also be implemented into wireless units.

Figure 6:
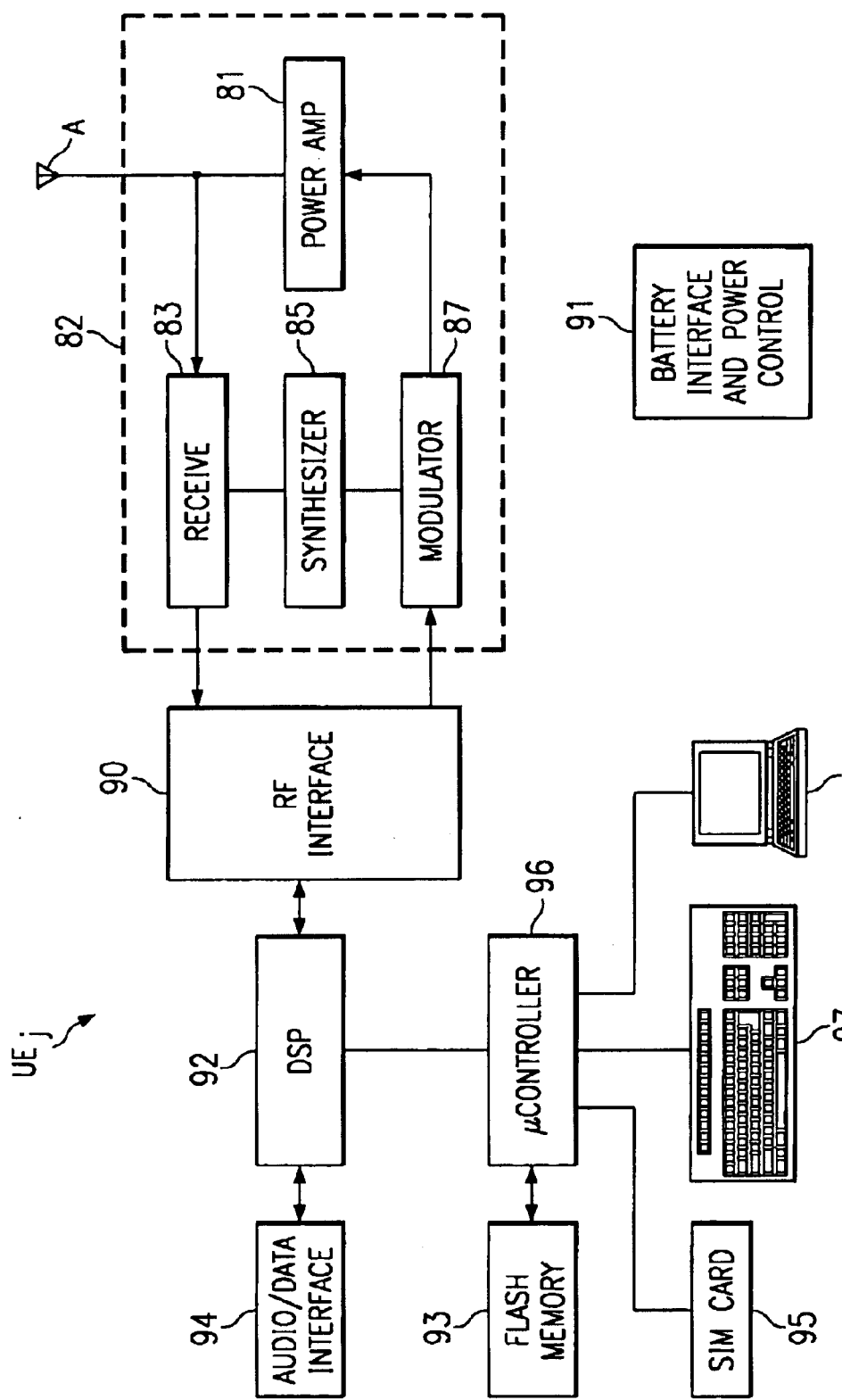
FIG. 6 is an electrical diagram, in schematic form, of a wireless unit in the system of FIG. 2, constructed according to an alternative implementation of the preferred embodiment of the invention.

Referring back to FIG. 2, wireless units UE, as noted above, correspond to mobile wireless telephone sets. FIG. 6 is an electrical diagram, in block form, of the electronic architecture of a typical mobile wireless unit $UE_j$ (the index j referring generically to one of the wireless units UE shown in FIG. 2). It is contemplated, of course, that different ones of the wireless units UE in the overall system, such as shown in FIG. 2, may be constructed according to different architectures. As such, the architecture of the construction of wireless unit $UE_j$ shown in FIG. 6 is provided by way of example only, it being understood that such other alternative architectures may also be used in connection with the present invention.

The exemplary architecture illustrated in FIG. 6 corresponds to a so-called "third generation", or "3G" baseband architecture, such as may be used to carry out WCDMA broadband communications, including voice and data. Radio subsystem 82 of wireless unit $UE_j$ is directly connected to antenna A, and handles the power amplification and analog processing of signals transmitted and received over antenna A. On the transmit side, modulator 87 in radio subsystem 82 receives the signals to be transmitted from RF (radio frequency) interface circuitry 90, and generates a broadband modulated analog signal, under the control of synthesizer 85. Power amplifier 81 amplifies the output of modulator 87 for transmission via antenna A. On the receive side, incoming signals from antenna A are received by receiver 83, filtered and processed under the control of synthesizer 85, and forwarded to RF interface circuitry 90.

RF interface circuitry 90 processes both incoming and outgoing signals within the analog baseband of wireless unit $UE_j$. On the transmit side, RF interface circuitry 90 receives digital signals from digital signal processor (DSP) 92, and performs the appropriate filtering and phase modulation appropriate for the particular transmission protocol. For example, multiple channels of encoded digital bitstreams may be forwarded to RF interface circuitry 90 by DSP 92. RF interface circuitry 90 converts these digital data into analog signals, phase-shifting selected converted bitstreams to provide both in-phase (I) and quadrature (Q) analog signal components, and applies analog filtering as appropriate to the signals as handed off to modulator 87 in radio subsystem 82 described above.

On the receive side, RF interface circuitry 90 converts the analog signal received by receiver 83 of radio subsystem 82 into the appropriate digital format for processing by DSP 92. For example, the in-phase (I) and quadrature (Q) components of the received signal are separated and filtered. Analog to digital conversion is then carried out by RF interface circuitry 90, so that digital bitstreams corresponding to the separated and filtered components of the received signal may be received by DSP 92.

DSP 92 executes the appropriate digital signal processing upon both the signals to be transmitted and those received. In this regard, DSP 92 is connected to audio/data interface 94, which in turn is coupled to the appropriate input/output devices (not shown), such as a microphone and speaker for voice signals. Audio/data interface 94 includes the necessary functionality for generating a sampled bitstream digital signal based upon its input data, and conversely includes the appropriate functionality for generating output signals corresponding to the received and processed communications. For the example of voice signals, audio/data interface 94 includes analog-to-digital conversion circuitry and filters for processing analog input signals from the microphone, and digital-to-analog conversion circuitry, filtering, and amplification for driving a speaker.

Other support circuitry is also provided within wireless unit $UE_j$ as shown in FIG. 6. In this example, microcontroller 96 handles the control of wireless unit $UE_j$ other than the data path. Such control functions include resource management, operating system control, and control of the human interface; in this regard, microcontroller 96 operates with such functions as flash memory 93 (for storage of the operating system and user preferences), SIM card 95 (for add-on functionality), keypad 97, and user display 98. In addition, wireless unit $UE_j$ also includes battery interface and power control subsystem 91, as shown in FIG. 6, for monitoring the status of the battery for wireless unit $UE_j$, and implementing power saving functions such as sleep modes, and the like.

The digital functions performed by DSP 92 will depend, of course, upon the communications protocol used by wireless unit $UE_j$. In this regard, DSP 92 preferably has a significant amount of processing capacity to handle the digital processing necessary for both the transmit and receive operations. An example of a suitable digital signal processor for use as DSP 92 is the TMS320c5x family of digital signal processors available from Texas Instruments Incorporated.

In its transmission operation, incoming digital signals from audio/data interface 94 are also encoded into symbols, for example by way of a vocoder operation performed by DSP 92. DSP 92 also encodes these symbols into a digital spread spectrum signal, by the application of channel codes. Scrambling or other encryption processing is then performed, along with the necessary pre-equalization and other filtering. The resulting digital signal is then forwarded to RF interface circuitry 90, as noted above.

In operation on the receive side, DSP 92 performs such functions as channel decoding of the data from RF interface circuitry 90 to retrieve a data signal from the received digitally spread signal, followed by the decoding of the speech symbols from the channel decoded data using techniques such as vocoder operations and the like. Equalization, error -correction, and decryption processes are also performed upon the received signal as appropriate. The resulting signal processed by DSP 92 on the receive side is then forwarded to audio/data interface 94, for amplification and output.

According to the preferred embodiment of the invention, particularly in the TDD context where the spreading factor remains relatively small, DSP 92 also performs the interference cancellation process described above relative to FIG. 5. In this regard, of course, wireless unit $UE_j$ is not necessarily processing incoming signals from a plurality of users, as in the case of base station 10. Rather, wireless unit $UE_j$ is receiving its desired communications from base station 10, along with other interfering signals generated by other sources (e.g., other wireless units in the area). The overall process by way of which DSP 92 performs this interference cancellation otherwise effectively follows the Gibbs sampler approach described above relative to FIG. 5. This process may be implemented entirely in software, executed by DSP 92, or alternatively a hardware accelerator may be utilized to perform this function. In either case, the benefits of rapid and reliable convergence toward an accurate interference cancellation and data decision is thus similarly provided in wireless unit $UE_j$ according to the present invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of cancelling interference among a plurality of interfering signals, comprising:
   storing digital values representative of a plurality of received signals;
   for each of the plurality of signals, performing a sequence of steps comprising:
      retrieving a digital value for a selected signal;
      cancelling, from the retrieved digital value, an estimate of interference based upon a data decision value for each of the plurality of signals other than the selected signal, to derive a soft data decision value;
      determining a probability distribution for the selected signal using the soft data decision value;
      selecting a random value;
      determining a data decision value for the selected signal by applying the random value to the determined probability distribution; and
      storing the data decision value for the selected signal; and repeating the sequence, for each of the plurality of signals over a plurality of passes.

2. The method of claim 1, further comprising:
   for each of the plurality of signals, deriving a final data decision value from each of the stored data decision values over the plurality of passes.

3. The method of claim 2, wherein the deriving step comprises:
   calculating the mode of at least a subset of the stored data decision values over the plurality of passes.

4. The method of claim 1, further comprising:
   prior to the cancelling step, for a first of the plurality of signals, selecting random initial data decision values for others of the plurality of signals.

5. The method of claim 1, further comprising:
   evaluating a convergence criterion for each of the plurality of passes;

responsive to the evaluated convergence criterion not indicating a desired level of convergence of the data decision values, repeating another pass of the sequence for each of the plurality of signals.

6. The method of claim 1, wherein the retrieving step comprises retrieving a plurality of samples for a selected signal;

and wherein the sequence of steps is performed, for each signal, for each of the retrieved plurality of digital values arranged as a vector.

7. The method of claim 1, wherein the stored digital values correspond to communication symbols.

8. The method of claim 1, wherein the stored digital values correspond to chips of signals for each of the signals;

and wherein the cancelling step comprises:
regenerating an interference estimate for each of a plurality of retrieved chips for the selected signal;
subtracting the interference estimates from the retrieved chips for the selected signal;
then despreading the results of the subtracting step into a symbol; and
generating a data decision from the symbol generated in the despreading step.

9. A communications station, comprising:
an antenna for receiving a plurality of analog communication signals;
radio interface circuitry, coupled to the antenna, for converting the received analog signals into a plurality of digital signals;
a processing device, coupled to the radio interface circuitry, for digitally processing the converted digital signals to cancel interference from among the plurality of signals, and comprising:
circuitry for performing the functions of:
storing digital values representative of the plurality of signals;
for each of the plurality of signals, performing a sequence of operations comprising:
retrieving a digital value of a selected signal;
cancelling, from the retrieved digital value, an estimate of interference based upon a data decision value for each of the plurality of signals other than the selected signal, to derive a soft data decision value;
determining a probability distribution for the selected signal using the soft data decision value;
selecting a random value;
determining a data decision value for the selected signal by applying the random value to the determined probability distribution; and
storing the data decision value for the selected signal;
repeating the sequence, for each of the plurality of signals, over a plurality of passes; and
for each of the plurality of values, deriving a final data decision value from each of the stored data decision values over the plurality of passes; and
symbol decode circuitry for decoding the final data decision values into digital data;
an interface, coupled to the processing device, for communicating the decoded digital data to a recipient.

10. The station of claim 9, wherein the processing circuitry comprises:
a buffer for storing the received digital values and the data decision values;
interference cancellation circuitry, coupled to the buffer, for performing the sequence of operations for each of the plurality of signals; and
a digital signal processor, for controlling the operation of the buffer, and for forwarding the final data decision values to the symbol decode circuitry.

11. The station of claim 10, wherein the station corresponds to a base station in a communications system;
wherein the plurality of signals corresponds to a signal from each of a plurality of users;
wherein the estimate of interference used in the cancelling operation is based on channel estimates for each of the plurality of users;
and wherein the digital signal processor is also for deriving the channel estimates.

12. The station of claim 10, wherein the signals are spread spectrum signals, each comprising a plurality of chips;
and wherein the processing circuitry further comprises:
a despreading function for despreading each plurality of chips into a symbol.

13. The station of claim 10, wherein the circuitry is also for performing the function of:
prior to the cancelling operation as applied to a first of the plurality of signals, selecting random initial data decision values for others of the plurality of signals.

14. The station of claim 10, wherein the processing circuitry comprises programmable logic, programmed to perform the repeating the repeated sequence of operations.

15. The station of claim 10, wherein the station corresponds to a wireless mobile unit operating in combination with a base station of a communications system.

* * * * *